(12) United States Patent
Chiu

(10) Patent No.: US 12,471,242 B2
(45) Date of Patent: Nov. 11, 2025

(54) HEAT DISSIPATION DEVICE AND CONTROL METHOD THEREOF

(71) Applicant: Getac Technology Corporation, New Taipei (TW)

(72) Inventor: Chia-Chang Chiu, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 400 days.

(21) Appl. No.: 18/101,664

(22) Filed: Jan. 26, 2023

(65) Prior Publication Data

US 2024/0147659 A1 May 2, 2024

(30) Foreign Application Priority Data

Oct. 26, 2022 (CN) .......................... 202211317137.0

(51) Int. Cl.
*H05K 7/20* (2006.01)
*G06F 1/20* (2006.01)

(52) U.S. Cl.
CPC .......... *H05K 7/20209* (2013.01); *G06F 1/20* (2013.01); *H05K 7/20136* (2013.01); *G06F 2200/201* (2013.01)

(58) Field of Classification Search
CPC .. H05K 7/20209; H05K 7/20136; G06F 1/20; G06F 2200/201; G06F 1/14; G06F 1/1684; G06F 1/1698; G06F 1/203; G06F 1/206; Y02D 10/00
See application file for complete search history.

(56) References Cited

U.S. PATENT DOCUMENTS

| | | |
|---|---|---|
| 2004/0196631 A1 | 10/2004 | Ueda et al. |
| 2014/0240031 A1 | 8/2014 | Vadakkanmaruveedu et al. |
| 2016/0013745 A1 | 1/2016 | North et al. |
| 2017/0047784 A1 | 2/2017 | Jung et al. |
| 2021/0029848 A1* | 1/2021 | Lin .......................... G06F 1/203 |
| 2022/0147128 A1* | 5/2022 | Stevens ................... G06F 1/206 |
| 2022/0187882 A1* | 6/2022 | Chang ....................... G06F 1/20 |
| 2022/0316883 A1* | 10/2022 | Kimishima ........... H04W 4/027 |

FOREIGN PATENT DOCUMENTS

| | | |
|---|---|---|
| CN | 114109882 A | 3/2022 |
| KR | 102230216 B1 | 3/2021 |
| TW | 201606201 A | 2/2016 |
| WO | 2016/184231 A1 | 11/2016 |

* cited by examiner

Primary Examiner — Zhipeng Wang
(74) Attorney, Agent, or Firm — troutman pepper locke; Tim Tingkang Xia, Esq.

(57) ABSTRACT

A heat dissipation device for a computing unit includes a fan unit, a signal receiving unit, a time unit and a control unit. The signal receiving unit receives a satellite positioning signal, and generates a signal strength according to the satellite positioning signal. The time unit generates a real-time signal. The control unit is electrically connected to the fan unit, the signal receiving unit and the time unit, and adjusts a rotation speed of the fan unit according to the signal strength and the real-time signal so as to achieve heat dissipation. The present disclosure further includes a control method of the heat dissipation device.

8 Claims, 4 Drawing Sheets

HEAT DISSIPATION DEVICE AND CONTROL METHOD THEREOF

The application claims priority to Chinese Patent Application No. 202211317137.0, filed on Oct. 26, 2022, the disclosure of which is hereby incorporated by reference herein in its entirety.

BACKGROUND OF THE INVENTION

Field of the Invention

The present disclosure relates to a heat dissipation device and a control method thereof and, more particularly, to a heat dissipation device that controls a rotation speed of a fan according to a satellite positioning signal and a real-time signal, and a control method thereof.

DESCRIPTION OF THE PRIOR ART

With the advancement in functions and performance of digital devices, a large amount of heat is easily produced during high-speed operations. Thus, efficient heat dissipation of digital devices remains an important issue.

In a conventional heat dissipation method for digital devices, an approach adopting a fixed rotation speed is used. However, such approach generates fixed sound volume and cannot be automatically adjusted in response to environmental conditions, hence failing in attending to both heat dissipation efficiency for different application environments and acoustic optimization.

Therefore, there is a need to design a heat dissipation device and a control method thereof to solve the above technical problems.

SUMMARY OF THE INVENTION

It is one object of the present invention to provide a heat dissipation device that is capable of automatically changing a rotation speed of a fan with respect to an ambient environment, thereby solving the technical problems of the incapabilities of the prior art regarding automatic adjustment on heat dissipation efficiency according to environmental conditions and acoustic optimization, achieving the goal of convenient use.

To achieve the above object, a heat dissipation device provided by the present invention is applied to a computing unit, and includes a fan unit, a signal receiving unit, a time unit and a control unit. The signal receiving unit receives a satellite positioning signal, and generates a signal strength according to the satellite positioning signal. The time unit generates a real-time signal. The control unit is electrically connected to the fan unit, the signal receiving unit and the time unit, and adjusts a rotation speed of the fan unit according to the signal strength and the real-time signal.

In some embodiments, the signal strength is directly proportional to the rotation speed, and the real-time signal is inversely proportional to the rotation speed when the real-time signal is in a 24-hour time format.

In some embodiments, the heat dissipation device further includes an audio capturing unit. The audio capturing unit is electrically connected to the control unit, receives an ambient audio and generates volume according to the ambient audio. The control unit adjusts the rotation speed of the fan unit according to the volume, the signal strength and the real-time signal, wherein the volume is directly proportional to the rotation speed.

In some embodiments, the heat dissipation device further includes a temperature unit. The temperature unit is electrically connected to the control unit, and sense a temperature of the computing unit. The control unit adjusts the rotation speed of the fan unit according to the temperature, the signal strength and the real-time signal, wherein the temperature is directly proportional to the rotation speed.

In some embodiments, the heat dissipation device further includes a storage unit. The storage unit is electrically connected to the control unit, and stores a look-up table (LUT). The control unit adjusts the rotation speed of the fan unit according to the signal strength, the real-time signal and the LUT.

It is another object of the present invention to provide a control method of a heat dissipation device that is capable of automatically changing a rotation speed of a fan with respect to an ambient environment, thereby solving the technical problems of the incapabilities of the prior art regarding automatic adjustment on heat dissipation efficiency according to environmental conditions and acoustic optimization, achieving the goal of convenient use.

To achieve the above object, the control method provided by the present invention is applied to a computing unit, and includes: receiving a satellite positioning signal, and generating a signal strength according to the satellite positioning signal; generating a real-time signal; and adjusting a rotation speed of a fan unit according to at least one of the signal strength and the real-time signal.

In some embodiments, the signal strength is directly proportional to the rotation speed, and the real-time signal is inversely proportional to the rotation speed when the real-time signal is in a 24-hour time format.

In some embodiments, the control method further includes: receiving an ambient audio, and generating volume according to the ambient audio; and adjusting the rotation speed of the fan unit according to the volume, the signal strength and the real-time signal, wherein the volume is directly proportional to the rotation speed.

In some embodiments, the control method further includes: sensing a temperature of the computing unit; and adjusting the rotation speed of the fan unit according to the temperature, the signal strength and the real-time signal, wherein the temperature is directly proportional to the rotation speed.

In some embodiments, the control method further includes reading a look-up table (LUT), and adjusting the rotation speed of the fan unit according to the signal strength, the real-time signal and the LUT.

In conclusion, the heat dissipation device and the control method thereof of the present invention are capable of automatically changing the rotation speed of the fan unit according to different ambient environments of the heat dissipation device, thereby achieving different heat dissipation states corresponding to different conditions.

It should be noted that, when the ambient environment is outdoors, the rotation speed of the fan unit can be increased to reinforce the heat dissipation effect, without having to worry that the noise generated by the fan unit may interfere a user or other individuals. In an indoor environment, the rotation speed of the fan unit can be reduced, so that on the premise of safe operations of the computing unit, the concern that the noise generated by the fan unit may interfere a user or other individuals can be minimized. Alternatively, when the ambient environment is in the afternoon or at nighttime, the rotation speed of the fan unit can also be reduced, so that on the premise of safe operations of the computing unit, the concern that the noise generated by the fan unit may interfere a user or other individuals can be minimized.

Therefore, the heat dissipation device and the control method thereof of the present invention are capable of automatically changing a rotation speed of a fan with respect to an ambient environment, thereby solving the technical problems of the incapabilities of the prior art regarding automatic adjustment on heat dissipation efficiency according to environmental conditions and acoustic optimization, achieving the goal of convenient use.

To further understand the techniques, means and functions for achieving expected purposes adopted by the present invention, the present invention is described in detail with the accompanying drawings below so that the specific features and characteristics can be accordingly better understood. It should be noted that the drawings provided are for reference and illustration purposes, and are not to be construed as limitations to the present invention.

DETAILED DESCRIPTION OF THE EMBODIMENTS

Figure 1:
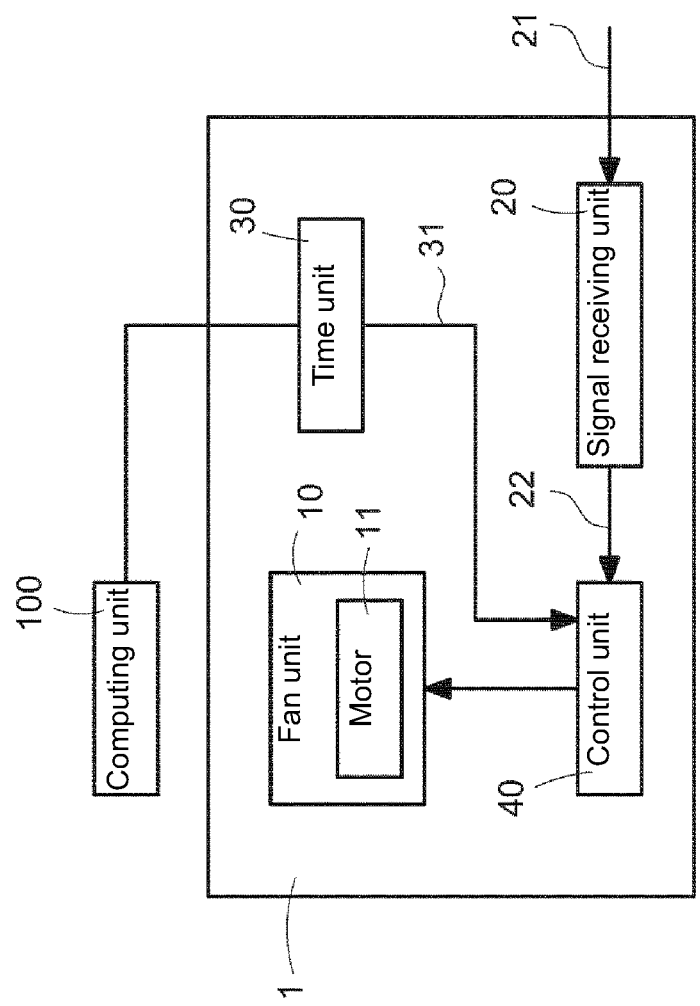
FIG. 1 is a function block diagram of a heat dissipation device according to a first embodiment of the present invention.

Implementation details of the present invention are described by way of specific embodiments for a person skilled in the art to easily and fully understand other advantages and effects of the present invention on the basis of the disclosure of the present application. The present invention may be implemented or applied by other specific embodiments and changes and modifications may also be made to various details in the description on the basis of different perspectives and applications without departing from the spirit of the present invention.

It should be noted that, the structures, scale, sizes and numbers of elements depicted in the drawings of the present application are used in coordination with the disclosure of the present application for reading and better understanding of a person skilled in the art, and are not to be construed as limitation implementable to the present invention and thus do not form any substantive technical significance. All structural modifications, scale relation changes and size adjustment, without affecting the effects that can be generated and achievable objects of the present invention, are encompassed within the coverable range of the technical contents disclosed by the present invention.

The technical contents and details of the present invention are described with the accompanying drawings below.

Figure 2:
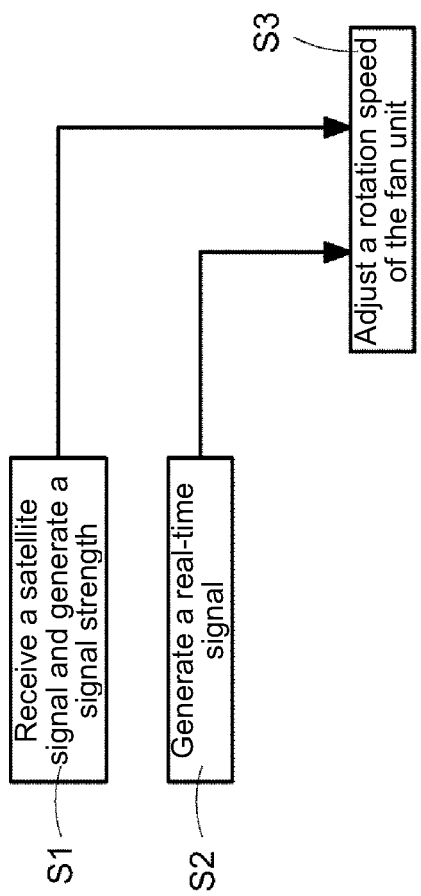
FIG. 2 is a flowchart of a control method according to the first embodiment of the present invention.

FIG. 1 shows a function block diagram of a heat dissipation device according to a first embodiment of the present invention, and FIG. 2 shows a flowchart of a control method according to the first embodiment of the present invention.

Referring to FIG. 1 and FIG. 2, a heat dissipation device 1 according to the first embodiment of the present invention is applied to a computing unit 100, and includes a fan unit 10, a signal receiving unit 20, a time unit 30 and a control unit 40. The control method of the heat dissipation device 1 may include step S1 to step S3.

The computing unit 100 may include one of a micro control unit (MCU), a micro processing unit (MPU), a central processing unit (CPU), an application-specific integrated circuit (ASIC), a digital signal processor (DSP), a graphics processing unit (GPU), a field-programmable gate array (FPGA) and a system-on-chip (SoC). The MCU may also include a circuit board based on an Arduino machine code structure, for example but not limited to, a printed circuit board (PCB).

The fan unit 10 includes a pivotally rotatable aerodynamic structure provided with a plurality of surrounding vanes (not shown), for example, an impeller fan or blower fan. The fan unit 10 adjusts an output air speed or air volume by, for example but not limited to, changing a rotation speed thereof.

In some embodiments, the fan unit 10 further includes a motor 11 pivotally connected to the aerodynamic structure. The rotation speed of the aerodynamic structure is changed by, for example but not limited to, the motor 11 to further adjust the output air speed or air volume.

As in step S1, the signal receiving unit 20 receives a satellite positioning signal 21, and generates a signal strength 22 according to the satellite positioning signal 21.

In some embodiments, the satellite positioning signal 21 may include a wireless signal output by a satellite on an earth orbit. Further, the satellite positioning signal 21 is a satellite signal compatible with a global navigation satellite system (GNSS), for example but not limited to, the assisted global positioning system (AGPS), the U.S. global positioning system (GPS), the Russian global navigation satellite system (GLONASS), the Chinese Beidou navigation satellite system (BDS), and the European Union Galileo satellite system.

In some embodiments, the signal receiving unit 20 may include an accelerometer, which is also referred to as an acceleration sensor or a G-sensor, and is a device for measuring the acceleration. Compared to a device that performs remote sensing, an accelerometer measures a motion thereof. When the accelerometer is applied to measure gravity (the gravitational acceleration G value caused by the center of the earth), it may be referred to as a gravimeter. When the accelerometer is applied to a micro-electro-mechanical system (MEMS) or geographic positioning, it may also be referred to as, for example but not limited to, a GNSS.

It should be noted that, in the present invention, it is determined by means of generating a signal strength 22 whether the heat dissipation device 1 is indoors or outdoors. Further, a common building is a structure in rigid materials (for example, concrete and reinforcement bars), and has an attenuating effect on the strength of wireless signals from satellites and base stations. For example but not limited to, when the heat dissipation device 1 is indoors, the satellite positioning signal 21 is interfered and hence attenuated by the building, and the signal receiving unit 20, by confirming that the received signal strength 22 is less than a predetermined threshold (not shown) and is thus weak, determines that the heat dissipation device 1 is indoors; when the heat dissipation device 1 is outdoors, the satellite positioning signal 21 is not interfered and thus attenuated by the building, and the signal receiving unit 20, by confirming that the received signal strength 22 is more than the predetermined threshold and is thus strong, determines that the heat dissipation device 1 is outdoors.

As in step S2, the time unit 30 generates a real-time signal 31.

In some embodiments, the time unit 30 is compatible with, for example but not limited to, the coordinated universal time (UTC), international atomic time, Greenwich mean time (GMT), integrated circuit time (or may be referred to as a real-time clock (RTC)), network time protocol (NTP) or GNSS.

Moreover, the time unit 30 may be, for example but not limited to, an integrated circuit (for example, a BIOS chip on a computer motherboard) electrically connected to the computing unit 100, and so the real-time signal 31 is an RTC signal.

Moreover, the time unit 30 may also be, for example but not limited to, a time program of an operating system (for example, Windows, MAC and Linux), and so the real-time signal 31 is an NTP signal.

It should be noted that, in the present invention, it is determined through the real-time signal 31 whether the heat dissipation device 1 needs to be adjusted in response to a time zone and routine hours of a user. For example, in response to a change of the heat dissipation device 1 in different time zones, the time unit 30 can generate a real-time signal 31 corresponding to the environment, for example, an updated GNSS at all times, and this is extremely practical for travelers who frequently travel around the globe for business trips. Thus, for example but not limited to, when the heat dissipation device 1 is carried to different time zones within short periods, mismatched normal human routine hours for different time zones are not presented, hence reducing the interference of adjusting to time difference.

Moreover, when the format of the real-time signal 31 output by the time unit 30 is in a 24-hour time, the larger the number is, the closer it gets to the rest time of normal human routine hours, but on the contrary, the smaller the number is, the closer it gets to the awake time of normal human routine hours (for example, after six o'clock in the morning). Accordingly, the control unit 40 can determine the rest time through the real-time signal 31, and reduce the rotation speed of the fan unit 10. Thus, for example but not limited to, on the premise of safe operations of the computing unit 100, the concern that the noise generated by the fan unit 10 may interfere a user or other individuals can be minimized.

The control unit 40 is electrically connected to the fan unit 10, the signal receiving unit 20 and the time unit 30.

As in step S3, the control unit 40 adjusts the rotation speed of the fan unit 10 according to the signal strength 22 and the real-time signal 31.

In some embodiments, the control unit 40 may include one of a micro control unit (MCU), a micro processing unit (MPU), a central processing unit (CPU), an application-specific integrated circuit (ASIC), a digital signal processor (DSP), a graphics processing unit (GPU), a field-programmable gate array (FPGA) and a system-on-chip (SoC). The MCU may also include a circuit board based on an Arduino machine code structure, for example, a printed circuit board (PCB). The SoC may be, for example but not limited to, a Raspberry Pi with a model number of 1A, 1A+, 1B, 1B+, 2B, 3B, 3B+, 3A+ or 4B.

It should be noted that, the control unit 40 includes an integrated circuit capable of outputting a pulse-width modulation (PWM) signal. Moreover, for example but not limited to, the control unit 40 can output a pulse to the motor 11, and adjust the rotation speed of the motor 11 by controlling a duty cycle of the output pulse, thereby changing the output air speed or air volume of the fan unit 10.

In some embodiments, the signal strength 22 is directly proportional to the rotation speed. That is, according to the determination result indicating whether the ambient environment of the heat dissipation device 1 is indoors or outdoors, the control unit 40 further adjusts the rotation speed of the fan unit 10. When the real-time signal 31 is in a 24-hour time format, the real-time signal 31 is inversely proportional to the rotation speed. That is, for example but not limited to, according to the determination result indicating normal human routine hours of an ambient environment, the control unit 40 further adjusts the rotation speed of the fan unit 10.

In conclusion, the heat dissipation device 1 and the control method thereof of the present invention are capable of automatically changing the rotation speed of the fan unit according to different ambient environments of the heat dissipation device 1, thereby achieving different heat dissipation states corresponding to different conditions.

It should be noted that, when the ambient environment is outdoors, the rotation speed of the fan unit 10 can be increased to reinforce the heat dissipation effect, without having to worry that the noise generated by the fan unit 10 may interfere a user or other individuals. In an indoor environment, the rotation speed of the fan unit 10 can be reduced, so that on the premise of safe operations of the computing unit 100, the concern that the noise generated by the fan unit 10 may interfere a user or other individuals can be minimized. Alternatively, when the time of the ambient environment is afternoon or nighttime, the rotation speed of the fan unit 10 can also be reduced, so that on the premise of safe operations of the computing unit 100, the concern that the noise generated by the fan unit 10 may interfere a user or other individuals can be minimized. However, the present invention is not limited thereto.

Figure 3:
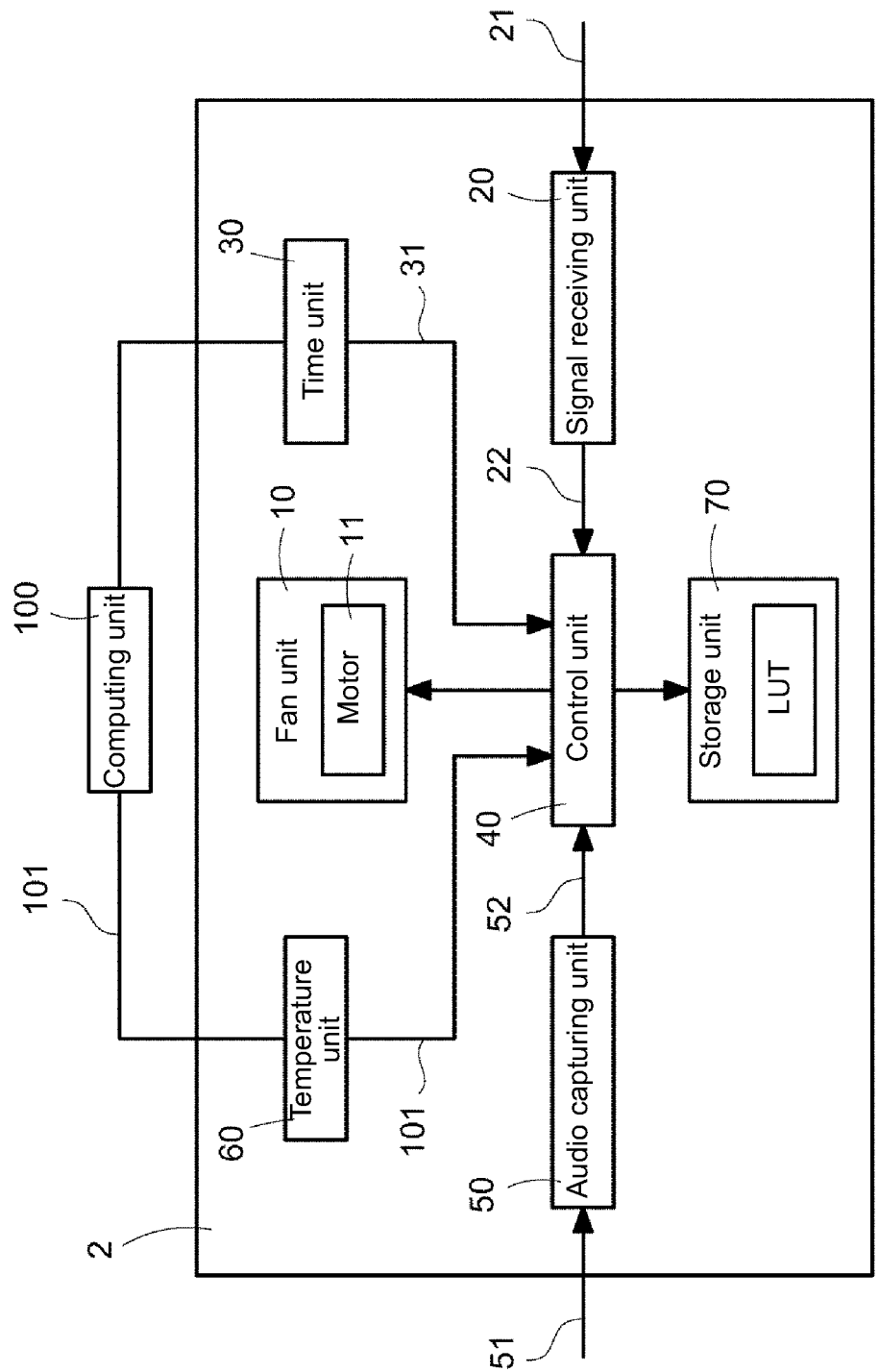
FIG. 3 is a function block diagram of a heat dissipation device according to a second embodiment of the present invention.
Figure 4:
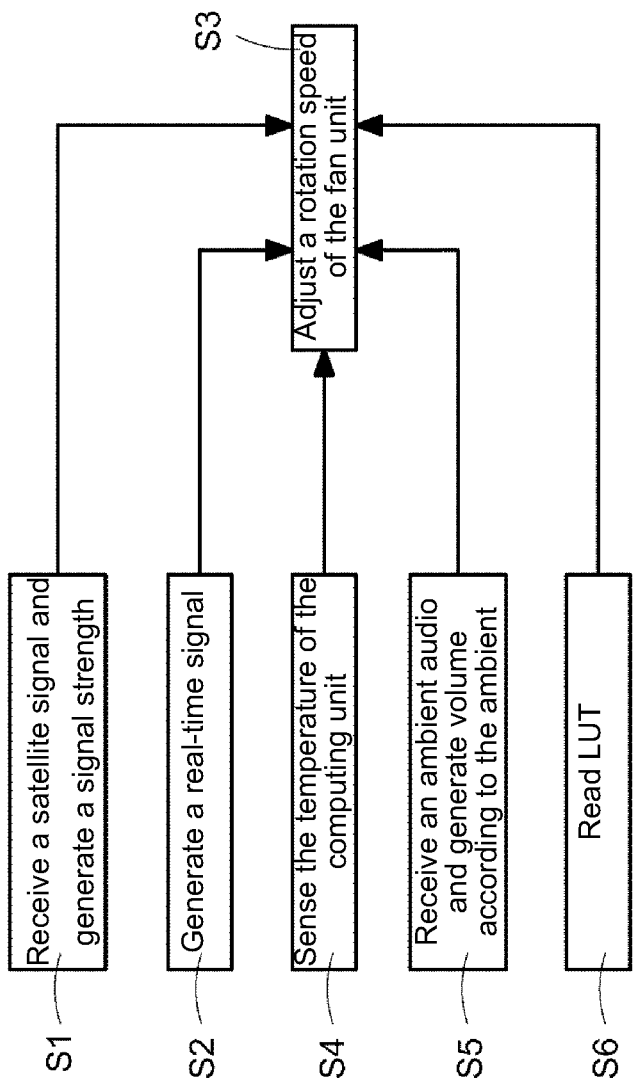
FIG. 4 is a flowchart of a control method according to the second embodiment of the present invention.

FIG. 3 shows a function block diagram of a heat dissipation device according to a second embodiment of the present invention, and FIG. 4 shows a flowchart of a control method according to the second embodiment of the present invention.

Referring to FIG. 3 and FIG. 4, a heat dissipation device 2 according to the second embodiment of the present invention is substantially the same as the heat dissipation device 1 of the first embodiment; however, the heat dissipation device 2 further includes an audio capturing unit 50, a temperature unit 60 and a storage unit 70. Compared to the control method of the heat dissipation device 1, the control method of the heat dissipation device 2 further includes step S4 to step S6.

The audio capturing unit 50 is electrically connected to the control unit 40. As in step S4, the audio capturing unit 50 receives an ambient audio 51, and generates volume 52 according to the ambient audio 51. Further, in step S3, the control unit 40 can adjust the rotation speed of the fan unit 10 according to the volume 52, the signal strength 22 and the real-time signal 31, wherein the volume 52 is directly proportional to the rotation speed.

In some embodiments, for example but not limited to, the audio capturing unit 50 may include a dynamic microphone, condenser microphone, electret condenser microphone, MEMS microphone, ribbon microphone, carbon microphone or assistive context-aware toolkit (ACAT), and the unit of the volume 52 may be in a sound pressure level in a unit of decibels (dB).

It should be noted that, the control unit 40 determines, for example but not limited to, according to the volume 52, the tolerance of the ambient environment for the noise generated by the fan unit 10. That is, when the control unit 40 determines according to the volume 52 that the ambient environment is noisy, it determines that the ambient environment has a high noise tolerance, and does not limit or further increase the rotation speed of the fan unit 10 so as to maintain or enhance the heat dissipation effect for the computing unit 100. When the control unit 40 determines according to the volume 52 that the ambient environment is quiet, it determines that the ambient environment has a low noise tolerance, and further reduces the rotation speed of the fan unit 10, so that on the premise of safe operations of the computing unit 100, the concern that the noise generated by the fan unit 10 may interfere a user or other individuals can be minimized.

The temperature unit 60 is electrically connected to the control unit 40. As in step S5, the temperature unit 60 senses a temperature 101 of the computing unit 100. Further, in step S3, the control unit 40 can adjust the rotation speed of the fan unit 10 according to the temperature 101, the signal strength 22 and the real-time signal 31, wherein the temperature 101 is directly proportional to the rotation speed.

In some embodiments, the temperature unit 60 may include, for example but not limited to, a thermocouple element, a semiconductor temperature sensor or a crystal oscillator.

It should be noted that, the control unit 40 determines, for example but not limited to, the load of the computing unit 100 according to the temperature 101. That is, when the control unit 40 determines that the temperature 101 is too high, it further increases the rotation speed of the fan unit 10 so as to enhance the heat dissipation effect for the computing unit 100 and prevent the computing unit 100 from getting damaged as a result of the excessive heat. When the control unit 40 determines that the temperature 101 is below a safety range, it does not limit or further reduce the rotation speed of the fan unit 10, so that on the premise of safe operations of the computing unit 100, the concern that the noise generated by the fan unit 10 may interfere a user or other individuals can be minimized.

The storage unit 70 is electrically connected to the control unit 40, and stores a look-up table (LUT). As in step S6, the control unit 40 reads the LUT, and adjusts the rotation speed of the fan unit 10 according to the signal strength 22, the real-time signal 31 and the LUT.

In some embodiments, the storage unit 70 may include, for example but not limited to, a non-volatile storage medium such as a NAND flash or EEPROM, so as to properly store the LUT for the control unit 40 to read at all times. Moreover, the stored LUT may be updated by means of a wired programming method such as I2C or a wireless transmission means such as over-the-air (OTA) programming.

In some embodiments, the LUT may include a control rule associated with at least one of the signal strength 22, the real-time signal 31, the volume 52 and the temperature 101 corresponding to the rotation speed of the fan unit 10, for the control unit 40 to control the rotation speed of the fan unit 10. For example, it is determined whether the ambient environment is indoors or outdoors according to whether the signal strength 22 is zero (for example, when the satellite positioning signal 21 cannot be received) or greater than zero (for example, when the satellite positioning signal 21 can be received).

In some embodiments, assuming that all of the signal strength 22, the real-time signal 31 and the volume 52 are taken into account, when the ambient environment is a noisy environment with a large volume 52, regardless of how the signal strength 22 and the real-time signal 31 are, the control unit 40 does not particularly control the rotation speed of the fan unit 10; that is, the fan unit 10 is allowed to operate in a normal state. When the ambient environment is an environment with noise in a moderate volume 52, regardless of how the signal strength 22 and the real-time signal 31 are, the control unit 40 controls the rotation speed of the fan unit 10 to be 90% of the rotation speed of the normal state. When the ambient environment is a quiet environment with a small volume 52 and is determined to be indoors according to the signal strength 22, according to the real-time signal 31, the control unit 40 controls the rotation speed of the fan unit 10 to be 90% of the rotation speed of the normal state in the morning and afternoon and 80% of the rotation speed of the normal state at nighttime. When the ambient environment is a quiet environment with a small volume 52 and is determined to be outdoors according to the signal strength 22, regardless of how the real-time signal 31 is, the control unit 40 controls the rotation speed of the fan unit 10 to be 90% of the rotation speed of the normal state. It should be noted that the above examples are illustrative but not restrictive.

Accordingly, for example but not limited to, in addition to the signal strength 22 and the real-time signal 31 of the first embodiment, the volume 52 and the temperature 101 are used by the control unit 40, so that the control unit 40 in the second embodiment further adjusts the rotation speed of the fan unit 10 according to different environmental conditions. By additionally sensing the environmental conditions, the rotation speed can be adjusted to better adapt to actual requirements, thereby providing more diversified operation modes for the fan unit 10.

In conclusion, the heat dissipation device and the control method thereof of the present invention are capable of automatically changing the rotation speed of the fan unit according to different ambient environments of the heat dissipation device, thereby achieving different heat dissipation states corresponding to different conditions.

It should be noted that, when the ambient environment is outdoors, the rotation speed of the fan unit can be increased to reinforce the heat dissipation effect, without having to worry that the noise generated by the fan unit may interfere a user or other individuals. In an indoor environment, the rotation speed of the fan unit can be reduced, so that on the premise of safe operations of the computing unit, the concern that the noise generated by the fan unit may interfere a user or other individuals can be minimized. Alternatively, when the time of the ambient environment is afternoon or nighttime, the rotation speed of the fan unit can also be reduced, so that on the premise of safe operations of the computing unit, the concern that the noise generated by the fan unit may interfere a user or other individuals can be minimized.

It should be noted that, in addition to determining the rotation speed of the fan unit according to the signal strength and the real-time signal, in some embodiments, for example but not limited to, the volume and the temperature are further used by the control unit, so that the control unit can further adjust the rotation speed of the fan unit according to different environmental conditions. By additionally sensing the environmental conditions, the rotation speed can be adjusted to better adapt to actual requirements, thereby providing more diversified operation modes for the fan unit.

Therefore, the heat dissipation device and the control method thereof of the present invention are capable of automatically changing a rotation speed of a fan with respect to an ambient environment, thereby solving the technical problems of the incapabilities of the prior art regarding automatic adjustment on heat dissipation efficiency according to environmental conditions and acoustic optimization, achieving the goal of convenient use.

The above descriptions are merely details and drawings of preferred specific embodiments of the present invention, and it should be noted that the features of the present invention are not limited to the above examples. The preferred embodiments are not restrictive of the present invention. Therefore, the scope of the present invention should be defined by the appended claims. All embodiments falling within the spirit of the claims of the present invention and similar variations thereof are covered within the scope of the present invention. Moreover, all equivalent changes and modifications conceivable to a person skill in the art are also encompassed within the scope of the claims of the present invention.

What is claimed is:

1. A heat dissipation device, applied to a computing unit, comprising:
    a fan unit;
    a signal receiving unit, configured to receive a satellite positioning signal and generate a signal strength according to the satellite positioning signal;
    a time unit, configured to generate a real-time signal; and
    a control unit, electrically connected to the fan unit, the signal receiving unit and the time unit, and configured to adjust a rotation speed of the fan unit according to the signal strength and the real-time signal;
    wherein the signal strength is directly proportional to the rotation speed, and the real-time signal is inversely proportional to the rotation speed when the real-time signal is in a 24-hour time format.

2. The heat dissipation device according to claim 1, further comprising:
    an audio capturing unit, electrically connected to the control unit, configured to receive an ambient audio and generate volume according to the ambient audio;
    wherein, the control unit adjusts the rotation speed of the fan unit according to the volume, the signal strength and the real-time signal, wherein the volume is directly proportional to the rotation speed.

3. The heat dissipation device according to claim 1, further comprising:
    a temperature unit, electrically connected to the control unit, and configured to sense a temperature of the computing unit;
    wherein, the control unit adjusts the rotation speed of the fan unit according to the temperature, the signal strength and the real-time signal, and the temperature is directly proportional to the rotation speed.

4. The heat dissipation device according to claim 1, further comprising:
    a storage unit, electrically connected to the control unit, and configured to store a look-up table (LUT);
    wherein, the control unit adjusts the rotation speed of the fan unit according to the signal strength, the real-time signal and the LUT.

5. A control method of a heat dissipation device, the heat dissipation device applied to a computing unit, the control method comprising:
    receiving a satellite positioning signal, and generating a signal strength according to the satellite positioning signal;
    generating a real-time signal; and
    adjusting a rotation speed of a fan unit according to at least one of the signal strength and the real-time signal;
    wherein the signal strength is directly proportional to the rotation speed, and the real-time signal is inversely proportional to the rotation speed when the real-time signal is in a 24-hour time format.

6. The control method according to claim 5, further comprising:
    receiving an ambient audio and generating volume according to the ambient audio; and
    adjusting the rotation speed of the fan unit according to the volume, the signal strength and the real-time signal, wherein the volume is directly proportional to the rotation speed.

7. The control method according to claim 5, further comprising:
    sensing a temperature according to the computing unit; and
    adjusting the rotation speed of the fan unit according to the temperature, the signal strength and the real-time signal, wherein the temperature is directly proportional to the rotation speed.

8. The control method according to claim 5, further comprising:
    reading a look-up table (LUT), and adjusting the rotation speed of the fan unit according to the signal strength, the real-time signal and the LUT.

* * * * *